(12) United States Patent
Wanaka (10) Patent No.: US 8,305,496 B2
(45) Date of Patent: Nov. 6, 2012

(54) SCALING PROCESS SYSTEM, VIDEO OUTPUT APPARATUS AND REPLAY APPARATUS

(75) Inventor: Keiji Wanaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 315 days.

(21) Appl. No.: 12/817,598

(22) Filed: Jun. 17, 2010

(65) Prior Publication Data

US 2010/0321578 A1 Dec. 23, 2010

(30) Foreign Application Priority Data

Jun. 18, 2009 (JP) ................................ 2009-145350

(51) Int. Cl.
*H04N 9/74* (2006.01)

(52) U.S. Cl. ........ 348/581; 348/578; 348/559; 348/552; 348/538; 348/537; 348/441; 348/445; 348/448; 348/608; 348/636; 348/680; 348/693; 345/660; 386/200

(58) Field of Classification Search .................. 348/581, 348/538, 552, 537, 441, 448, 445, 578, 608, 348/636, 680, 693; 345/660; 386/200
See application file for complete search history.

(56) References Cited

U.S. PATENT DOCUMENTS

| | | | | |
|---|---|---|---|---|
| 6,002,446 A * | 12/1999 | Eglit | ............................. | 348/581 |
| 6,567,544 B1 * | 5/2003 | Kanno et al. | .................. | 382/169 |
| 6,795,581 B1 * | 9/2004 | Nomura | ......................... | 382/232 |
| 6,903,749 B2 * | 6/2005 | Soo et al. | ....................... | 345/605 |
| 7,679,676 B2 * | 3/2010 | De Haan | ....................... | 348/453 |
| 8,041,110 B2 * | 10/2011 | Hasegawa | ..................... | 382/167 |
| 8,060,659 B2 * | 11/2011 | Ichieda | .............................. | 710/5 |
| 8,125,524 B2 * | 2/2012 | Znamenskiy et al. | ......... | 348/180 |
| 8,159,606 B2 * | 4/2012 | Sole et al. | ...................... | 348/441 |
| 2010/0054621 A1 * | 3/2010 | Qi et al. | ........................ | 382/260 |

FOREIGN PATENT DOCUMENTS

JP 2008-259180 A 10/2008

* cited by examiner

*Primary Examiner* — Jefferey Harold
*Assistant Examiner* — Mustafizur Rahman
(74) *Attorney, Agent, or Firm* — Crowell & Moring LLP

(57) ABSTRACT

Disclosed is a scaling process system including a replay apparatus and a video output apparatus which are connected via a HDMI, wherein each of the video output apparatus and the replay apparatus respectively comprises a between-pixel interpolation method table, wherein the video output apparatus including a request signal transmission device to transmit a request signal, a between-pixel interpolation method information receiving device to receive the between-pixel interpolation method information, a determining device to determine which of between-pixel interpolation method information of the replay apparatus or between-pixel interpolation method information of the video output apparatus is more high-performance, a deciding device to decide an apparatus to be used for the scaling process, and a control device to control the apparatus which is decided by the deciding device so as to carry out the scaling process, and wherein the replay apparatus including a request signal receiving device to receive the request signal and a between-pixel interpolation method information return device to return the between-pixel interpolation method information.

5 Claims, 7 Drawing Sheets

| VERSION INFORMATION : VER. 1 | | |
|---|---|---|
| IDENTIFIER | PIXEL INTERPOLATION METHOD TYPE | ORDER OF SUPERIORITY |
| O | A | 1 |
| | B | 2 |
| | C | 3 |
| | D | 4 |

FIG.3B

| VERSION INFORMATION : VER. 1 | | |
|---|---|---|
| IDENTIFIER | PIXEL INTERPOLATION METHOD TYPE | ORDER OF SUPERIORITY |
| O | A | 1 |
| | B | 2 |
| | C | 3 |
| | D | 4 |

(BEFORE UPDATE)

| VERSION INFORMATION : VER. 2 | | |
|---|---|---|
| IDENTIFIER | PIXEL INTERPOLATION METHOD TYPE | ORDER OF SUPERIORITY |
| O | A | 2 |
| | B | 4 |
| | C | 5 |
| | D | 6 |
| | E | 1 |
| | F | 3 |

(AFTER UPDATE)

FIG.4

PIXEL INTERPOLATION METHOD "A" OF REPLAY APPARATUS

↕ COMPARE

| VERSION INFORMATION : VER. 2 | | |
|---|---|---|
| IDENTIFIER | PIXEL INTERPOLATION METHOD TYPE | ORDER OF SUPERIORITY |
|  | A | 2 |
|  | B | 4 |
|  | C | 5 |
|  | D | 6 |
| O | E | 1 |
|  | F | 3 |

SCALING PROCESS SYSTEM, VIDEO OUTPUT APPARATUS AND REPLAY APPARATUS

BACKGROUND OF THE INVENTION

1. Field of the Invention

The present invention relates to a scaling process system which optimally carries out a scaling process of an image, a video output apparatus and a replay apparatus.

2. Description of Related Art

There are various types of formats such as NTSC (National Television System Committee), PAL (Phase Alternating Line), high-vision, personal computer signal and the like for video signals. When video signals of such various types of formats are to be displayed in a display which has various numbers of pixels, there is a need to carry out a scaling process to convert the signal format in accordance with the number of pixel of each display.

Conventionally, as a between-pixel interpolation method which is a technique of scaling process of a digital video, for example, a linear interpolation method, a three-dimensional interpolation method, a spline interpolation method and the like are known. In these methods, pixels which are uniformly processed by an interpolation filter from neighboring pixels are added between the original pixels.

For example, when scaling process is carried out between a DVD (Digital Versatile Disc) recorder and an AV (Audio Visual) device such as a television receiver, in general, there is known a method to carry out the scaling process in the DVD recorder side and a method to carry out the scaling process in the television receiver side. Here, there is a need to determine by which one of the two devices the scaling process is to be carried out.

In view of the above matter, there is developed a technique to determine by which one of the two devices the scaling process is to be carried out (for example, see JP 2008-259180).

In such determination, ideally, a device which can execute the most high-performance scaling process is to be selected among devices.

Comparison of superiority/inferiority of scaling performance which can be determined by a numerical value such as a resolution is easy. However, there is no unequivocal evaluation method for between-pixel interpolation method and the method is generally subjectively decided. Even in JP 2008-259180, there is a possibility that the most optimal scaling process is not necessarily carried out because a particular setting of criteria for judgment regarding between-pixel interpolation method is not disclosed.

SUMMARY OF THE INVENTION

It is, therefore, a main object of the present invention is to provide a scaling process system which can carry out a scaling process with a more preferable between-pixel interpolation method, a video output apparatus and a replay apparatus.

According to a first aspect of the present invention, there is provided a scaling process system comprising a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the video output apparatus comprises a request signal transmission device to transmit a request signal for requesting between-pixel interpolation method information which indicates the between-pixel interpolation method which is used when carrying out the scaling process in the replay apparatus to the replay apparatus, a between-pixel interpolation method information receiving device to receive the between-pixel interpolation method information which is returned from the replay apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process, and wherein the replay apparatus comprises a request signal receiving device to receive the request signal which is transmitted by the request signal transmission device of the video output apparatus, and a between-pixel interpolation method information return device to return the between-pixel interpolation method information of the replay apparatus to the video output apparatus in response to the request signal.

According to a second aspect of the present invention, there is provided a scaling process system comprising a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the replay apparatus comprises a request signal transmission device to transmit a request signal for requesting between-pixel interpolation method information which indicates the between-pixel interpolation method which is used when carrying out the scaling process in the video output apparatus to the video output apparatus, a between-pixel interpolation method information receiving device to receive the between-pixel interpolation method information which is returned from the video output apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process, and wherein the video output apparatus comprises a request signal receiving device to receive the request signal which is transmitted by the request signal transmission device of the replay apparatus, and a between-pixel interpolation method information return device to return the between-pixel interpolation method information of the video output apparatus to the replay apparatus in response to the request signal.

According to a third aspect of the present invention, there is provided a video output apparatus which is connected with a replay apparatus via a HDMI comprising a between-pixel interpolation method table to decide a superiority/inferiority of a between-pixel interpolation method which is used when carrying out a scaling process, a request signal transmission device to transmit a request signal for requesting between-pixel interpolation method information which indicates the between-pixel interpolation method which is used when carrying out the scaling process in the replay apparatus to the replay apparatus, a between-pixel interpolation method information receiving device to receive the between-pixel interpolation method information which is returned from the replay apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process.

According to a fourth aspect of the present invention, there is provided a replay apparatus which is connected with a video output apparatus via a HDMI comprising a between-pixel interpolation method table to decide a superiority/inferiority of a between-pixel interpolation method which is use when carrying out a scaling process, a request signal transmission device to transmit a request signal for requesting between-pixel interpolation method information which indicates the between-pixel interpolation method which is used when carrying out the scaling process in the video output apparatus to the video output apparatus, a between-pixel interpolation method information receiving device to receive the between-pixel interpolation method information which is returned from the video output apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process.

According to the present invention, a scaling process with a more preferable between-pixel interpolation method can be carried out in a scaling process system including an output device and a display device which are connected via HDMI.

Therefore, the original image quality can be maintained in time of the scaling process and even more high quality image can be realized.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of the present invention will be described with reference to the drawings. Here, the scope of the invention is not limited to the examples shown in the drawings.

First Embodiment

Figure 1:
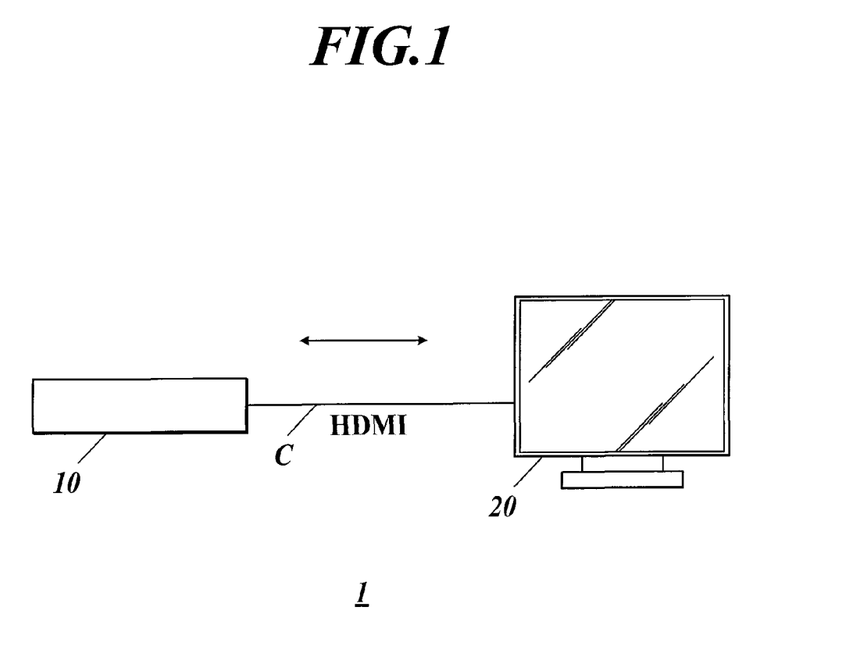
FIG. 1 is a structural diagram of a scaling process system of the present invention.

As shown in FIG. 1, the scaling process system 1 includes a replay apparatus 10 and a video output apparatus 2.

The replay apparatus 10 and the video output apparatus 20 are connected to each other with a HDMI cable C of HDMI (High Definition Multimedia Interface) standard. Further, video data and audio data are transmitted to the video output apparatus 20 side from the replay apparatus 10 with control signal by the HDMI.

First, structure of the replay apparatus 10 will be described.

For example, the replay apparatus 10 is a DVD recorder which carries out replay of video data and the like recorded in DVD (Digital Versatile Disc).

Figure 2:
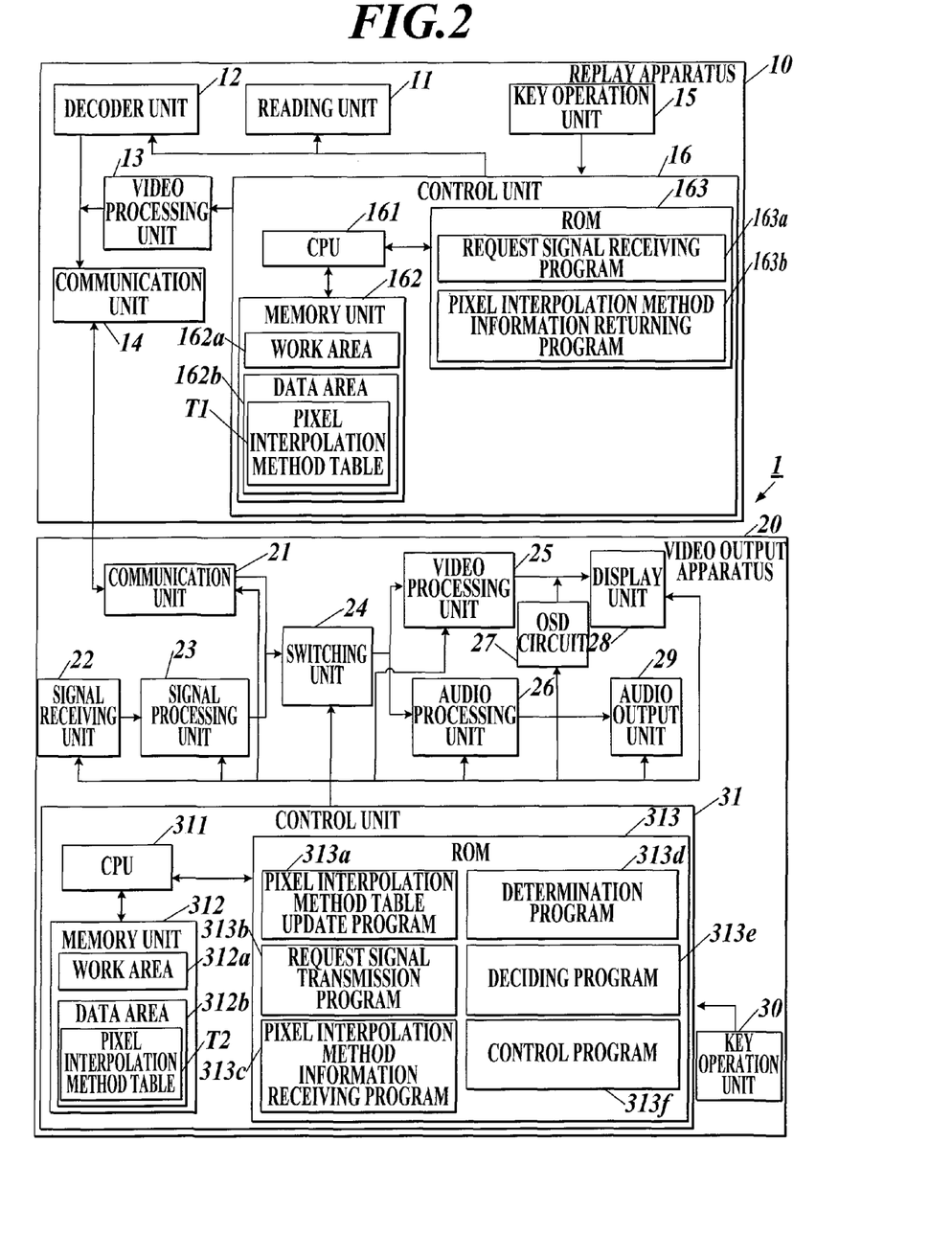
FIG. 2 is a block diagram showing a control structure of a replay apparatus and a video output apparatus in the scaling process system of the first embodiment.

As shown in FIG. 2, the replay apparatus 10 is connected with the video output apparatus 10 which displays video based on the video data which is to be replayed in the replay apparatus 10 by the HDMI cable C. Further, the replay apparatus 10 transmits various types of data such as video data of video to be replayed to the video output apparatus 20 via the HDMI cable C.

For example, the replay apparatus 10 includes a reading unit 11, a decoder unit 12, a video processing unit 13, a communication unit 14, a key operation unit 15, a control unit 16 to integrally control the above each part and the like.

For example, the reading unit 11 reads out contents data which is recorded in DVD (omitted from drawing) and outputs the read contents data to the decoder unit 12.

In particular, the reading unit 11 reads out contents data which is recorded in DVD and outputs the read contents data to the decoder unit 12 by irradiating laser beam to the reflecting layer of DVD and by generating a voltage signal according to the reflection light by an opto-electric conversion and a current/voltage conversion, for example.

The decoder unit 12 carries out a predetermined decode process to the contents data which is read out in the reading unit 11.

In particular, for example, the decoder unit 12 includes a separator, a video decoder, an audio decoder (all of which are omitted from the drawing) and the like, and the contents data which is inputted from the reading unit 11 is separated into a plurality of data such as video data, audio data, a sub-video data and the like in the separator and the separated video data is outputted to the video decoder and the separated audio data is outputted to the audio decoder. Further, in the video decoder, the separated video data is decoded in accordance with the MPEG form in the video decoder and the separated audio data is decoded in accordance with the MPEG audio form in the audio decoder.

The video processing unit 13 carries out a predetermined scaling process to the video data which is outputted from the decoder unit 12.

In particular, for example, the video processing unit 13 includes LSI (Large Scale Integration) and the like, and when an instruction to execute the scaling process is given by the after mentioned control unit 31 of the video output apparatus 20, the video processing unit 13 carries out the scaling process to the video data which is outputted from the decoder unit 12 in response to the instruction.

The communication unit 14 transmits various types of data which are outputted from the video processing unit 13 and the decoder unit 12 to an external device such as a video output apparatus 20 or the like with control signal.

In particular, the communication unit 14 includes a HDMI terminal corresponding to HDMI, and the communication unit 14 is connected with the video output apparatus 20 by the HDMI cable C.

The HDMI cable C includes a CEC line to communicate CEC (Consumer Electronics Control) signal and a video/audio line to communicate video/audio signal.

The CEC line is structured so that data communication can be carried out in both ways so that the CEC signal can be sent and received between each of the control units 16 and 13 of the replay apparatus 10 and the video output apparatus 20, respectively. The video/audio line carries out transmission of the video/audio signal to the video output apparatus 20 from the replay apparatus 10 via the communication units 14 and 21.

The CEC is structured with a general-purpose vendor command which is common for each company to control power, input switching and the like and an optional vendor command which can be uniquely defined by each manufacturer.

In the embodiment, sending and receiving of data of various types of information in both ways is executed by using the CEC vendor command of HDMI. Data of various types of information to be sent and received by using the CEC vendor command are version information of between-pixel interpolation method tables T1 and T2 each of which is included in the replay apparatus 10 and the video output apparatus 20, respectively, the between-pixel interpolation method tables T1 and T2 and between-pixel interpolation method information of the replay apparatus 10 and the video output apparatus 20 and the like. The details will be described later.

The key operation unit 15 is used when a user inputs various types of instructions.

In particular, for example, the key operation unit 15 includes a plurality of keys for a user to input various types of instructions, and when a key is pushed and operated by a user, the input operation signal corresponding to the pushed key is outputted to the control unit 16.

The control unit 16 includes a CPU (Central Processing Unit) 161, a memory unit 162, a ROM (Read Only Memory) 163 and the like.

The CPU 161 executes various types of programs which are stored in the ROM 163 according to the input signals inputted from each part of the replay apparatus 10, the input operation signals based on the pushing operation of various types of keys in the key operation unit 15, and also, the CPU 161 integrally controls the overall operation of the replay apparatus 10 by outputting output signal to each part of the replay apparatus 10 based on the program for execution.

For example, the memory unit 162 includes a work area 162a which is structured of a volatile memory such as a RAM (Random Access Memory) and a data area 162b which is structured of a non-volatile memory such as an EPROM (Erasable Programmable ROM).

The work area 162a stores processing results which are generated when executing various types of programs by the CPU 161, the inputted data and the like.

The data area 162b stores the between-pixel interpolation method table T1 for deciding superiority/inferiority of the between-pixel interpolation method at the time of scaling process in the scaling process system 1.

Figure 3A:
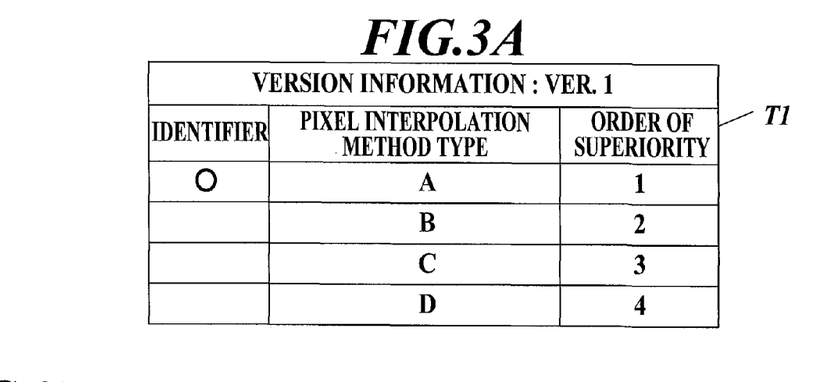
FIG. 3A is a diagram of an example showing a between-pixel interpolation method table.

In the between-pixel interpolation method table T1, items of "between-pixel interpolation method type" and items of "order of superiority" are stored so as to be corresponded to each other.

That is, in the between-pixel interpolation table T1, at least one or more types of between-pixel interpolation methods are stored in the item of "between-pixel interpolation method type", and numbers for deciding the superiority/inferiority are allocated as "order of superiority" when a plurality of types of between-pixel interpolation methods are stored.

Further, the between-pixel interpolation method table T1 includes an identifier to select any one of the stored between-pixel interpolation methods and the between-pixel interpolation method which is to be executed in the replay apparatus 10 can be identified. The identified between-pixel interpolation method is to be extracted by the control unit 16 as the between-pixel interpolation method information of the replay apparatus 10 in time of execution of the after mentioned between-pixel interpolation method information return program 163b.

Moreover, version information which indicates the version of the between-pixel interpolation method table T1 is added to the between-pixel interpolation method table T1.

The version information is extracted in response to an instruction of the control unit 31 of the video output apparatus 20 in time of execution of the after mentioned between-pixel interpolation method table update program 313a of the video output apparatus 20.

In particular, as shown in FIG. 3A, the between-pixel interpolation method table T1 stores four types of between-pixel interpolation methods, that are A, B, C and D, as the "between-pixel interpolation method type", for example, and each of numbers 1 to 4 is allocated to each method as the "order of superiority". Further, "A" which is the between-pixel interpolation method to be executed in the replay apparatus 10 is identified.

Moreover, the version information which shows that the between-pixel interpolation method table T1 is version 1 is added as "Ver. 1" in the between-pixel interpolation table T1.

Here, for example, between-pixel interpolation method types are various types of known between-pixel interpolation methods such as linear interpolation method, three-dimensional interpolation method, spline interpolation method and the like, in particular. Further, order of superiority of these methods is set in advance and is stored in the memory unit 162*a*.

For example, the ROM 163 includes a program storage area which is formed of a non-volatile memory and stores the request signal receiving program 163*a*, the between-pixel interpolation method information return program 163*b* and the like.

For example, the request signal receiving program 163*a* is a program to make the CPU 161 realize a function to receive a request signal for requesting the between-pixel interpolation method information which indicates the between-pixel interpolation method to be used in the scaling process in the replay apparatus 10.

In particular, when a request signal is transmitted from the video output apparatus 20 by the after-mentioned request signal transmission program 313*b* of the video output apparatus 20 being executed, the CPU 161 receives the request signal by executing the request signal receiving program 163*a*.

The CPU 161 functions as the request signal receiving device along with the communication unit 14 by executing the request signal receiving program 163*a*.

For example, the between-pixel interpolation method information return program 163*b* is a program to make the CPU 161 realize a function to return the between-pixel interpolation method information of the replay apparatus 10 to the video output apparatus 20.

In particular, when the request signal for requesting the between-pixel interpolation method information is received by the execution of the request signal receiving program 163*a*, the CPU 161 reply to the request signal and refers to the between-pixel interpolation method table T1 which is stored in the data area 162*b* of the memory unit 162 to extract the between-pixel interpolation method information of the replay apparatus 10. Then, the CPU 161 returns the extracted between-pixel interpolation method information of the replay apparatus 10 to the video output apparatus 20.

For example, in the example shown in FIG. 3A, the CPU 161 refers to the between-pixel interpolation method table T1 to extract "A" as the between-pixel interpolation method information of the replay apparatus 10, and thereafter, the CPU 161 returns "A" to the video output apparatus 20.

At this time, the CPU 161 returns the between-pixel interpolation method information by using the CEC vendor command of HDMI.

The CPU 161 functions as the between-pixel interpolation method information return device along with the communication unit 14 by executing the between-pixel interpolation method information return program 163*b*.

Next, structure of the video output apparatus 20 will be described.

For example, the video output apparatus 20 is a television receiver for displaying video based on video data and the like inputted from a television broadcasting station or an external device such as the replay apparatus 10.

As shown in FIG. 2, the video output apparatus 20 is connected with the replay apparatus 10 which inputs various types of data such as video data and the like by the HDMI cable C. Further, the video output apparatus 20 displays video based on the video data which is inputted from the replay apparatus 10 via the HDMI cable C.

The video output apparatus 20 includes a communication unit 21, a signal receiving unit 22, a signal processing unit 23, a switching unit 24, a video processing unit 25, an audio processing unit 26, an OSD (On Screen Display) circuit 27, a display unit 28, an audio output unit 29, a key operation unit 30, a control unit 31 for integrally controlling each of the above parts and the like.

The communication unit 21 receives video data and the like which are transmitted from an external device such as the replay apparatus 10.

In particular, the communication unit 21 includes a HDMI terminal corresponding to HDMI, and the communication unit 21 is connected to the replay apparatus 10 by the HDMI cable C.

The communication unit 21 receives video data and audio data which are transmitted with a control signal from the communication unit 14 of the replay apparatus 10 via the CEC line and the video/audio line of the HDMI cable C.

The signal receiving unit 22 includes an antenna/tuner and the like and receives broadcasting signals which are sent out from television broadcasting stations.

The signal processing unit 23 carries out a predetermined signal processing such as demodulation/decoding and the like to the broadcasting signals and the like which are inputted from the signal receiving unit 22.

The switching unit 24 switches and selects data to be inputted by switching connection to either of the HDMI terminal provided at the communication unit 21 or the signal processing unit 23 in accordance with the control by the control unit 31, and outputs the data to the after-mentioned video processing unit 25, the audio processing unit 26 and the like.

The video processing unit 25 carries out various types of predetermined video processing to the video data inputted from the switching unit 24 to generate video signal and outputs the generated video signal to the display unit 28.

In particular, the video processing unit 25 is structured with LSI or the like, for example, and the video processing unit 25 carries out a scaling process in response to an instruction to the video data which is outputted from the switching unit 24 when the instruction to execute the scaling process is instructed by the control unit 31 of the video output apparatus 20.

Here, the video processing unit 25 may be structured so as to carry out various types of processing such as an image quality adjusting process other than the scaling process.

The audio processing unit 26 carries out various types of predetermined audio processing to audio data inputted from the switching unit 24 to generate audio signal and outputs the generated audio signal to the audio output unit 29.

The OSD circuit 27 carries out a process to combine OSD data (omitted from drawing) stored in the memory unit 312 or the like to the video data which is outputted to the display unit 28.

The display unit 28 display video based on the video data which is inputted from the video processing unit 25.

In particular, the display unit 28 includes a display (omitted from drawing) such as LCD (Liquid Crystal Display) or the like, for example, and the display unit 28 displays video based on the video data inputted from the video processing unit 25 and EPG (Electric Program Guide) on the display.

The audio output unit 29 outputs audio based on audio data inputted from the audio processing unit 26.

In particular, the audio output unit 29 includes a speaker (omitted from drawing) and the like, and the audio output unit 29 outputs audio based on audio data inputted from the audio processing unit 26 from the speaker.

The key operation unit 30 is used when a user inputs various types of instructions.

In particular, the key operation unit 30 includes a plurality of keys for a user to input various types of instructions, for example, and the key operation unit 30 outputs the input operation signal corresponding to the pushed key to the control unit 31 when a pushing operation of the key is carried out by a user.

The control unit 31 includes a CPU 311, a memory unit 312, a ROM 313 and the like.

The CPU 311 executes various types of programs which are stored in the ROM 313 according to the input signal inputted from each part of the video output apparatus 20, the input operation signal based on pushing operation of various types of keys in the key operation unit 30 and the like. Also, the CPU 311 integrally controls the entire operation of the video output apparatus 20 by outputting output signal to each part of the video output apparatus 20 based on the program for execution.

For example, the memory unit 312 includes a work area 312*a* formed of a volatile memory such as RAM or the like and a data area 312*b* formed of a non-volatile memory such as EPROM or the like.

The work area 312*a* stores processing results which occurs when various types of programs are executed by the CPU 311, inputted data and the like.

The data area 312*b* stores the between-pixel interpolation method table T2 which decides the superiority/inferiority of the between-pixel interpolation method used at the time of scaling process in the scaling process system 1.

The between-pixel interpolation method table T2 is structured in similar manner as the between-pixel interpolation method table T1 of the above described replay apparatus 10. Therefore, description of the between-pixel interpolation method table T2 will be omitted.

For example, the ROM 313 includes a program storage area formed of a non-volatile memory, and in particular, the ROM 313 stores a between-pixel interpolation method table update program 313*a*, a request signal transmission program 313*b*, a between-pixel interpolation method information receiving program 313*c*, a determination program 313*d*, a deciding program 313*e*, a control program 313*f* and the like.

For example, the between-pixel interpolation method table update program 313*a* is a program to make the CPU 311 update the table of old version in accordance with a new version when the version of the between-pixel interpolation method table T1 of the replay apparatus 10 and the version of the between-pixel interpolation method table T2 of the video output apparatus 20 are not same.

In particular, when the CPU 311 carries out the scaling process, the CPU 311 first executes the between-pixel interpolation method table update program 313*a* to execute the following update process of the between-pixel interpolation method table.

In the update process, the CPU 311 first obtains version information of the between-pixel interpolation method table T1 from the replay apparatus 10 to compare with the version information of the between-pixel interpolation method table T2 of the video output apparatus 20. Then, the CPU 311 executes the following process when the version of the between-pixel interpolation method table T1 differs from the version of the between-pixel interpolation method table T2.

When the between-pixel interpolation method table T1 of the replay apparatus 10 is a newer version than the between-pixel interpolation method table T2 of the video output apparatus 20, the CPU 311 obtains the between-pixel interpolation method table T1 from the replay apparatus 10 and updates the between-pixel interpolation method table T2 of the video output apparatus 20.

In particular, the CPU 311 transmits the control signal to the replay apparatus 10 to make the replay apparatus 10 transmit the between-pixel interpolation method table T1 of the replay apparatus 10 to the video output apparatus 20. Then, the CPU 161 of the replay apparatus 10 replies to this control signal and extracts the between-pixel interpolation method table T1 which is stored in the data area 162*b* of the memory unit 162 to transmit to the video output apparatus 20. Next, the CPU 311 updates the between-pixel interpolation method table T2 by using the between-pixel interpolation method table T1 which is transmitted from the replay apparatus 10.

On the other hand, when the between-pixel interpolation method table T1 of the replay apparatus 10 is an older version than the between-pixel interpolation method table T2 of the video output apparatus 20, the CPU 311 outputs the between-pixel interpolation method table T2 of the video output apparatus 20 to the replay apparatus 10 to update the between-pixel interpolation method table T1 of the replay apparatus 10.

In particular, the CPU 311 transmits the between-pixel interpolation method table T2 of the video output apparatus 20 to the replay apparatus 10. Then, the CPU 161 of the replay apparatus 10 receives the between-pixel interpolation method table T2 and updates the between-pixel interpolation method table T1 by using the received between-pixel interpolation method table T2.

At this time, the CPU 311 carries out sending and receiving of version information and the between-pixel interpolation method table T1 by using the CEC vendor command of HDMI.

Figure 3B:
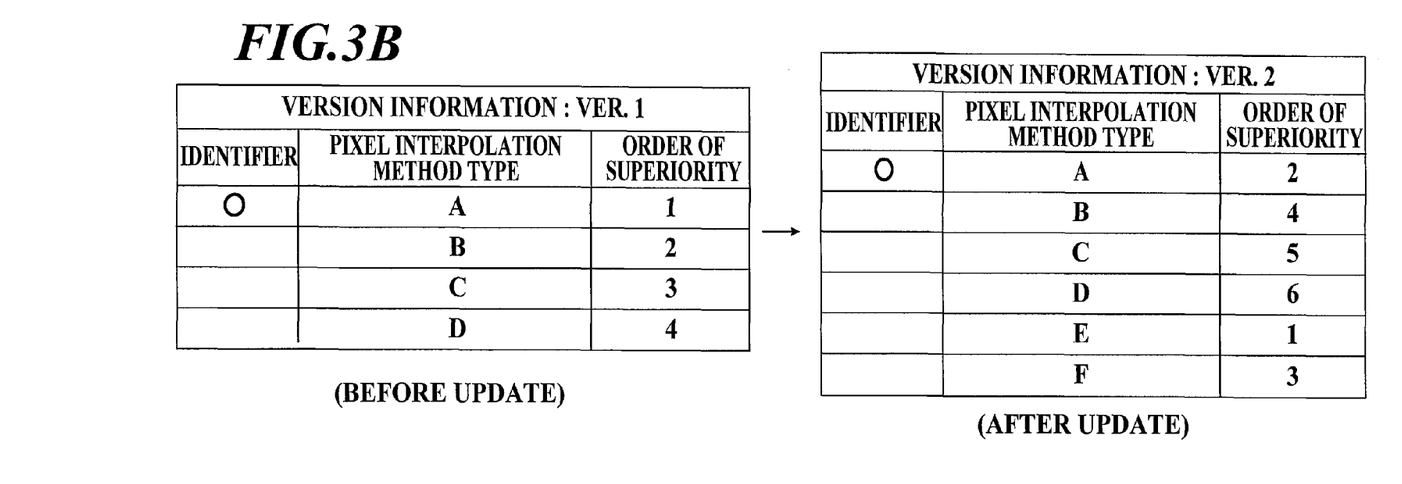
FIG. 3B is a diagram for explaining an update of the between-pixel interpolation method table.

FIG. 3B shows an example in which the between-pixel interpolation method table of version 1 is updated to the between-pixel interpolation method table of version 2.

In the between-pixel interpolation method table of version 1, four types of between-pixel interpolation method types, which are A to D, are stored. On the other hand, in the between-pixel interpolation method table of version 2, six types of between-pixel interpolation method types, which are A to F, are stored.

Here, two types of the between-pixel interpolation methods E and F which are not stored in the table of version 1 are to be added to the table at the time of update.

For example, when the order of superiority of between-pixel interpolation methods is E>A>F>B>C>D, each of the numbers 1, 2, 3 and 4 is to be orderly allocated to the between-pixel interpolation method of A, B, C and D, respectively, in the between-pixel interpolation method table of version 1. However, when it is updated to the between-pixel interpolation method table of version 2, the between-pixel interpolation method A, B, C, D, E and E are to be reordered so that each number of 2, 4, 5, 6, 1 and 3 is reallocated, respectively.

Therefore, for example, the order of superiority of the between-pixel interpolation method "A" changes to "2" from "1".

For example, the request signal transmission program 313*b* is a program to make the CPU 311 realize a function to transmit a request signal for requesting the between-pixel interpolation method information which indicates the between-pixel interpolation method of the replay apparatus 10 to the replay apparatus 10.

In particular, the CPU 311 makes the version of the between-pixel interpolation method table T1 of the replay apparatus 10 and the version of the between-pixel interpolation method table T2 of the video output apparatus 20 be the same by executing the between-pixel interpolation method table update program 313a, thereafter, the CPU 311 executes the request signal transmission program 313b to transmit the request signal to request the between-pixel interpolation method information to the replay apparatus 10.

At this time, the CPU 311 transmits the request signal by using the CEC vendor command of HDMI.

The CPU 311 functions as the request signal transmission device along with the communication unit 21 by executing the request signal transmission program 313b.

For example, the between-pixel interpolation method information receiving program 313c is a program to make the CPU 311 realize a function to receive the between-pixel interpolation method information which is returned from the replay apparatus 10 in reply to the above request signal.

In particular, when the request signal is returned from the replay apparatus 10 by the execution of the between-pixel interpolation method information return program 163b of the replay apparatus 10, the CPU 311 receives the between-pixel interpolation method information of the replay apparatus 10 by executing the between-pixel interpolation method information receiving program 313c.

The CPU 311 functions as the between-pixel interpolation method information receiving device along with the communication unit 21 by executing the between-pixel interpolation method information receiving program 313c.

For example, the determination program 313d is a program to make the CPU 311 realize a function to determine whether which between-pixel interpolation method information of the replay apparatus 10 or the video output apparatus 20 is high-performance based on the between-pixel interpolation method table T2 by comparing the between-pixel interpolation method information of the replay apparatus 10 with the between-pixel interpolation method information of the video output apparatus 20.

In particular, when the between-pixel interpolation method information of the replay apparatus 10 is received by executing the between-pixel interpolation method information receiving program 313c, the CPU 311 refers to the between-pixel interpolation method table T2 which is stored in the memory unit 312 to compare with the between-pixel interpolation method information of the video output apparatus 20.

Then, whichever is higher in the order of superiority in the between-pixel interpolation method table T2 is determined as being high-performance.

Figure 4:
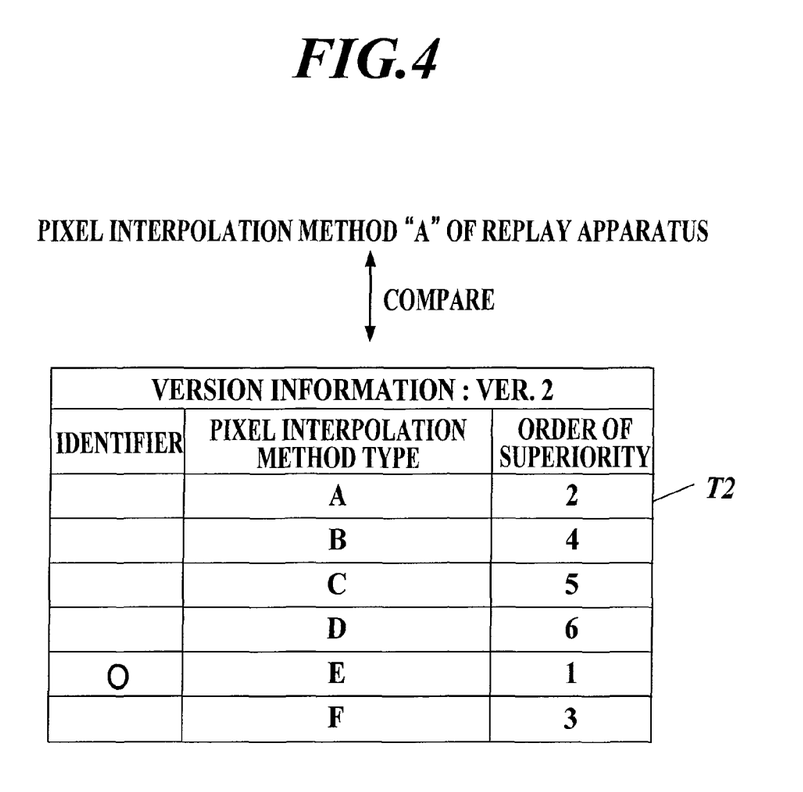
FIG. 4 is a diagram for explaining a comparison method of the between-pixel interpolation methods of the replay apparatus and the video output apparatus.

For example, as shown in FIG. 4, when the between-pixel interpolation method information of the video output apparatus 20 is "E", the CPU 311 determines that the between-pixel interpolation method of the video output apparatus 20 is more high-performance when the between-pixel interpolation method information of the replay apparatus 10 is "A".

The CPU 311 functions as the determination device by executing the determination program 313d.

For example, the deciding program 313e is a program to make the CPU 311 realize a function to decide the device which stores the between-pixel interpolation method information which is determined as being high-performance by the execution of the determination program 313d as the device to be used for the scaling process.

In particular, when either one of the between-pixel interpolation method information of the replay apparatus 10 or the video output apparatus 20 is determined as being high-performance by the execution of the determination program 313d, the CPU 311 decides the apparatus which stores the between-pixel interpolation method information which is determined as being high-operation as the apparatus to be used for the scaling process and stores information regarding which of the apparatuses is to be used for the scaling process in the memory unit 312.

For example, in the example of FIG. 4, the CPU 311 decides the video output apparatus 20 as the apparatus to be used for the scaling process.

The CPU 311 functions as the deciding device by executing the deciding program 313e.

For example, the control program 313f is a program to make the CPU 311 realize a function to carry out a control to the apparatus which is decided by the execution of the deciding program 313e so as to make the decided apparatus carry out the scaling process.

In particular, when the CPU 311 decided to use the replay apparatus 10 for the scaling process by the execution of the deciding program 313e, the CPU 311 executes the control program 313f to output an instruction signal to the video processing unit 13 of the replay apparatus 10 so as to execute the scaling process.

On the other hand, when the video output apparatus 20 is decided as the apparatus to be used for the scaling process, the CPU 311 executes the control program 313f to output an instruction signal to the video processing unit 25 of the video output apparatus 20 so as to execute the scaling process.

The CPU 311 functions as the control device by executing the control program 313f.

Next, operation of the scaling process system 1 of the embodiment will be described.

Figure 5:
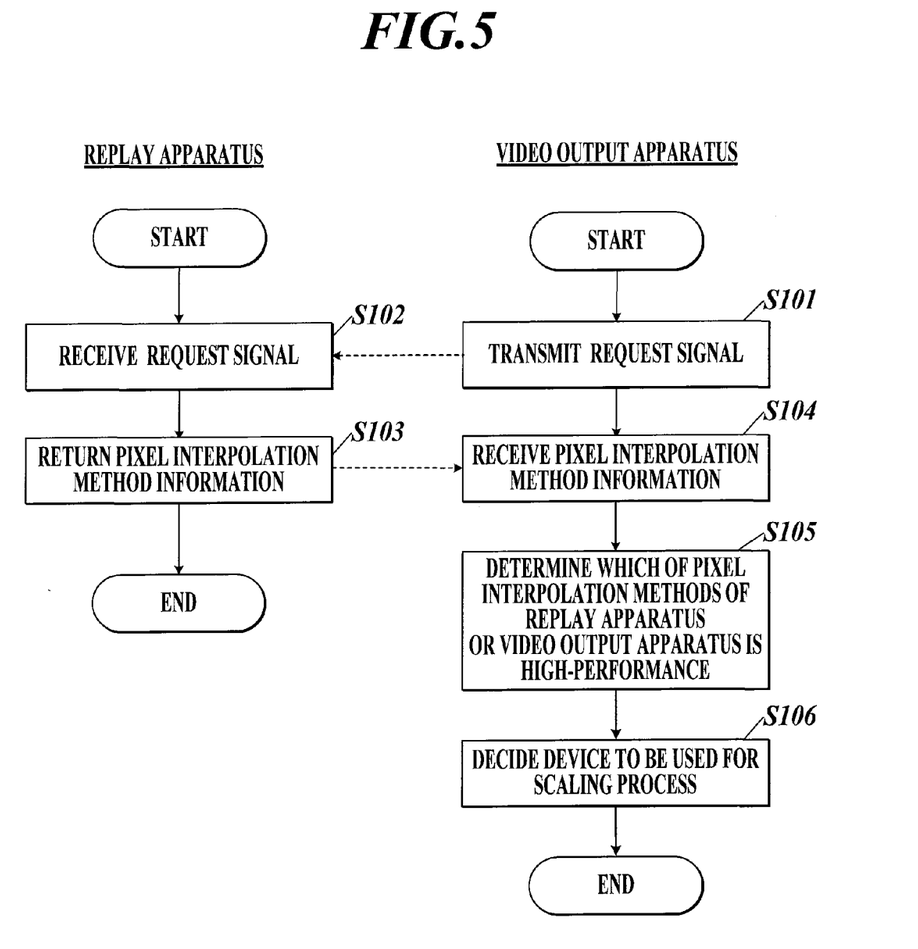
FIG. 5 is a flowchart showing a device deciding process which is carried out in the scaling process system of the first embodiment.

FIG. 5 is a flowchart showing a device deciding process which is executed by the scaling process system of the embodiment.

Here, as for executing the process, it is assumed that the replay apparatus 10 and the video output apparatus 20 are provided with the between-pixel interpolation method tables T1 and T2, respectively, of same version.

When the device deciding process is started, first, in step S101, the control unit 31 of the video output apparatus 20 transmits a request signal to the replay apparatus 10 to request the between-pixel interpolation method information via the communication unit 21.

Next, in step S102, the control unit 16 of the replay apparatus 10 receives the request signal which is transmitted from the video output apparatus 20 by the communication unit 14.

Next, in step S103, the control unit 16 of the replay apparatus 10 returns the between-pixel interpolation method information to the video output apparatus 20 via the communication unit 14.

Next, in step S104, the control unit 31 of the vide output apparatus 20 receives the between-pixel interpolation method information which is returned from the replay apparatus 10 by the communication unit 21.

Next, in step S105, the control unit 31 of the video output apparatus 20 compares the between-pixel interpolation method information of the replay apparatus 10 with the between-pixel interpolation method information of the video output apparatus 20 to determine which of the between-pixel interpolation method information is high-performance based on the between-pixel interpolation method table T2.

Next, in step S106, the control unit 31 of the video output apparatus 20 decides the apparatus which stores the between-pixel interpolation method information which is determined as being high-performance as the apparatus to be used for the scaling process and stores information regarding which of the apparatuses is to be used for the scaling process in the memory unit 312, and thereafter, the process is finished.

As described above, according to the scaling process system 1 of the embodiment, in the scaling process system 1 including the replay apparatus 10 and the video output apparatus 20 which are connected via HDMI, the scaling process can be carried out with more preferable between-pixel interpolation method by carrying out the comparison of the between-pixel interpolation method information.

Therefore, the original image quality can be maintained in time of scaling process and image quality of more high-definition can be realized.

Further, because the request signal is transmitted by the CEC vendor command of HDMI and the between-pixel interpolation method information is returned by the CEC vendor command of HDMI, even a large amount of information can be handled and a prompt process can be realized.

Furthermore, in time of the device deciding process, by making the between-pixel interpolation method tables T1 and T2 of the replay apparatus 10 and the video output apparatus 20, respectively, so as to be the same, performance of each between-pixel interpolation method can be recognized by each other. Therefore, the device which is suitable for the scaling process can be determined more preferably.

Here, the CEC of HDMI can be used to transmit other information such as enhancement function information, for example, other than the between-pixel interpolation method information.

Further, in the embodiment, a structure where the video output apparatus 20 executes the update process of the between-pixel interpolation method table by the between-pixel interpolation method table update program 313*a* is exemplified and described. However, the structure can be that the between-pixel interpolation method table update program 313*a* is provided in the replay apparatus 10 and that the update process of the between-pixel interpolation method table is executed by the replay apparatus 10.

That is, it may be structured that the update process of the between-pixel interpolation method table is executed by the replay apparatus 10 and thereafter, the device deciding process is executed by the video output apparatus 20.

Second Embodiment

Next, the second embodiment of the present invention will be described centering on the points which are different from the first embodiment. Here, same symbols are used for the structures which are similar to the first embodiment and the descriptions will be omitted.

Figure 6:
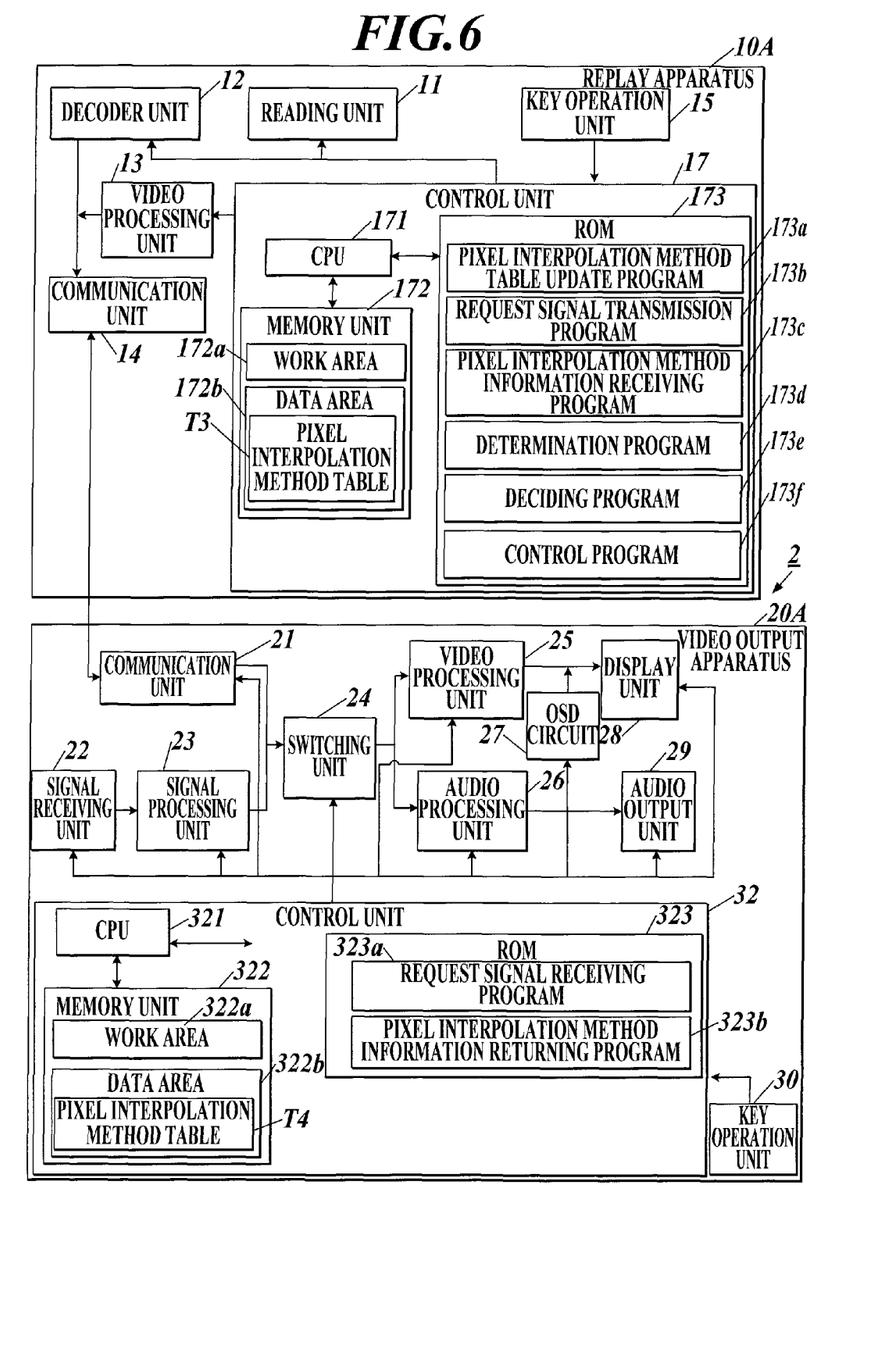
FIG. 6 is a block diagram showing a control structure of a replay apparatus and a video output apparatus in a scaling process system of the second embodiment.

The scaling process system 2 of the second embodiment includes a replay apparatus 10A and a video output apparatus 20A.

As shown in FIG. 6, for example, the replay apparatus 10A includes the reading unit 11, the decoder unit 12, the video processing unit 13, the communication unit 14, the key operation unit 15, the control unit 17 to integrally control each of the above parts and the like.

The control unit 17 includes the CPU 171 for integrally controlling the entire operation of the replay apparatus 10A, the memory unit 172 having the work area 172*a* and the data area 172*b*, the ROM 173 having the program storage area and the like.

In the data area 172*b* of the memory unit 172, the between-pixel interpolation method table T3 is stored.

Here, the between-pixel interpolation method table T3 has a structure similar to the between-pixel interpolation method tables T1 and T2 of the first embodiment, therefore, detail description will be omitted.

For example, the between-pixel interpolation method table update program 173*a*, the request signal transmission program 173*b*, the between-pixel interpolation method information receiving program 173*c*, the determination program 173*d*, the deciding program 173*e*, the control program 173*f* and the like are provided in the ROM 173.

Here, each of the between-pixel interpolation method table update program 173*a*, the request signal transmission program 173*b*, the between-pixel interpolation method information receiving program 173*c*, the determination program 173*d*, the deciding program 173*e* and the control program 173*f* are for realizing the functions similar to the between-pixel interpolation method table update program 313*a*, the request signal transmission program 313*b*, the between-pixel interpolation method information receiving program 313*c*, the determination program 313*d*, the deciding program 313*e* and the control program 313*f* of the first embodiment, respectively, therefore, detail descriptions will be omitted.

Moreover, the video output apparatus 20A includes the communication unit 21, the signal receiving unit 22, the signal processing unit 23, the switching unit 24, the video processing unit 25, the audio processing unit 26, the OSD circuit 27, the display unit 28, the audio output unit 29, the key operation unit 30, the control unit 32 to integrally control each of the above parts and the like.

The control unit 32 includes the CPU 321 to integrally control the entire operation of the video output apparatus 20A, the memory unit 322 having the work area 322*a* and the data area 322*b*, the ROM 323 having the program storage area and the like.

In the data are 322*b* of the memory unit 322, the between-pixel interpolation method table T4 is stored.

Here, the between-pixel interpolation method table T4 is similarly structured as the between-pixel interpolation method tables T1 and T2 of the first embodiment, therefore, detail description will be omitted.

For example, the request signal receiving program 323*a*, the between-pixel interpolation method information return program 232*b* and the like are provided in the ROM 323.

Here, each of the request signal receiving program 323*a* and the between-pixel interpolation method information return program 323*b* are for realizing the functions similar to the request signal receiving program 163*a* and the between-pixel interpolation method information return program 163*b* of the first embodiment, respectively, therefore, detail descriptions will be omitted.

Figure 7:
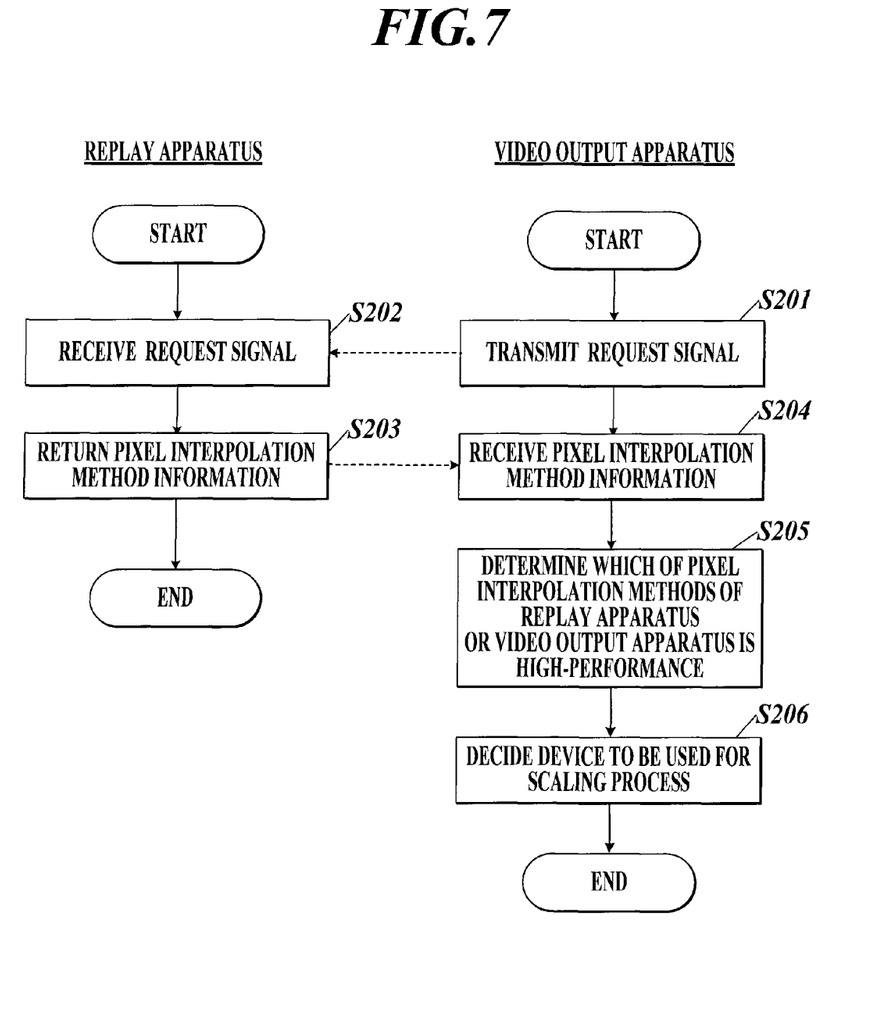
FIG. 7 is a flowchart showing a device deciding process which is carried out in the scaling process system of the second embodiment.

FIG. 7 is a flowchart showing the device deciding process which is executed by the scaling process system 2 of the embodiment.

Here, steps S201, S204, S205 and S206 in FIG. 7 are to be executed by the control unit 17 of the replay apparatus 10A, and the particular processing contents are similar to steps S101, S104, S105 and S106 of FIG. 5 in the first embodiment, therefore, detail descriptions will be omitted.

Further, steps S202 and S203 in FIG. 7 are to be executed by the control unit 32 of the video output apparatus 20A and the particular processing contents are similar to steps S102 and S103 in FIG. 5 of the first embodiment, therefore, detail descriptions will be omitted.

That is, in the scaling process system 2 of the embodiment, it is structured so that the control unit 17 of the replay apparatus 10A transmits the request signal for requesting the between-pixel interpolation method information and so that the control unit 32 of the video output apparatus 20A replies to the request signal. The replay apparatus 10A executes the device deciding process to decide the device which is to execute the scaling process by comparing the between-pixel interpolation method information and determining based on the reply from the video output apparatus 20A. Thereafter, the control unit 17 of the replay apparatus 10A outputs an instruction signal to instruct the execution of the scaling process to the video processing unit 13 of the replay apparatus 10A and the video processing unit 25 of the video output apparatus 20A.

Further, the control unit 17 of the replay apparatus 10A carries out the update process of the between-pixel interpolation method table by the between-pixel interpolation method table update program 173*a*.

Here, in the above described embodiment, it is structured that the replay apparatus 10A executes the update process of the between-pixel interpolation method table by the between-pixel interpolation method table update program 173*a*. However, it can be structured so that the between-pixel interpolation method table update program 173*a* is provided in the video output apparatus 20A and so that the update process of the between-pixel interpolation method table is executed by the video output apparatus 20A.

That is, it can be structured so as to execute the update process of the between-pixel interpolation method table by the video output apparatus 20A, and thereafter, the device deciding process is carried out by the replay apparatus 10A.

According to a first aspect of the preferred embodiments of the present invention, there is provided a scaling process system comprising a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the video output apparatus comprises a request signal transmission device to transmit a request signal for requesting between-pixel interpolation method information which indicates the between-pixel interpolation method which is used when carrying out the scaling process in the replay apparatus to the replay apparatus, a between-pixel interpolation method information receiving device to receive the between-pixel interpolation method information which is returned from the replay apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process, and wherein the replay apparatus comprises a request signal receiving device to receive the request signal which is transmitted by the request signal transmission device of the video output apparatus, and a between-pixel interpolation method information return device to return the between-pixel interpolation method information of the replay apparatus to the video output apparatus in response to the request signal.

According to a second aspect of the preferred embodiments of the present invention, there is provided a scaling process system comprising a replay apparatus and a video output apparatus which are connected via a HDMI, wherein each of the video output apparatus and the replay apparatus respectively comprises a between-pixel interpolation method table for deciding a superiority/inferiority of a between-pixel interpolation method which is used when carrying out a scaling process in the scaling process system, wherein the replay apparatus comprises a request signal transmission device to transmit a request signal for requesting between-pixel interpolation method information which indicates the between-pixel interpolation method which is used when carrying out the scaling process in the video output apparatus to the video output apparatus, a between-pixel interpolation method information receiving device to receive the between-pixel interpolation method information which is returned from the video output apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process, and wherein the video output apparatus comprises a request signal receiving device to receive the request signal which is transmitted by the request signal transmission device of the replay apparatus, and a between-pixel interpolation method information return device to return the between-pixel interpolation method information of the video output apparatus to the replay apparatus in response to the request signal.

Preferably, the request signal transmission device transmits the request signal by a CEC vendor command of the HDMI, and the between-pixel interpolation method information return device returns the between-pixel interpolation method information by the CEC vendor command of the HDMI.

According to a third aspect of the preferred embodiments of the present invention, there is provided a video output apparatus which is connected with a replay apparatus via a HDMI comprising a between-pixel interpolation method table to decide a superiority/inferiority of a between-pixel interpolation method which is used when carrying out a scaling process, a request signal transmission device to transmit a request signal for requesting between-pixel interpolation method information which indicates the between-pixel interpolation method which is used when carrying out the scaling process in the replay apparatus to the replay apparatus, a between-pixel interpolation method information receiving device to receive the between-pixel interpolation method information which is returned from the replay apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus, a deciding device to decide an apparatus in which the between-pixel interpolation method information which is determined as being high-performance by the determining device is stored as an apparatus to be used for the scaling process and a control device to control the apparatus which is decided by the deciding device so as to carry out the scaling process.

According to a fourth aspect of the preferred embodiments of the present invention, there is provided a replay apparatus which is connected with a video output apparatus via a HDMI comprising a between-pixel interpolation method table to decide a superiority/inferiority of a between-pixel interpolation method which is use when carrying out a scaling process, a request signal transmission device to transmit a request signal for requesting between-pixel interpolation method information which indicates the between-pixel interpolation method which is used when carrying out the scaling process in the video output apparatus to the video output apparatus, a between-pixel interpolation method information receiving device to receive the between-pixel interpolation method information which is returned from the video output apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus, a deciding device to decide an apparatus in which the between-pixel interpolation method information which is determined as being high-performance by the determining device is stored as an apparatus to be used for the scaling process and a control device to control the apparatus which is decided by the deciding device so as to carry out the scaling process.

The entire disclosure of Japanese Patent Application No. 2009-145350 filed on Jun. 18, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A scaling process system comprising a replay apparatus and a video output apparatus which are connected via a HDMI,
  wherein each of the video output apparatus and the replay apparatus respectively comprises a between-pixel interpolation method table for deciding a superiority/inferiority of a between-pixel interpolation method which is used when carrying out a scaling process in the scaling process system,
  wherein the video output apparatus comprises;
  a request signal transmission device to transmit a request signal for requesting between-pixel interpolation method information which indicates the between-pixel interpolation method which is used when carrying out the scaling process in the replay apparatus to the replay apparatus,
  a between-pixel interpolation method information receiving device to receive the between-pixel interpolation method information which is returned from the replay apparatus in response to the request signal,
  a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus,
  a deciding device to decide an apparatus in which the between-pixel interpolation method information which is determined as being high-performance by the determining device is stored as an apparatus to be used for the scaling process, and
  a control device to control the apparatus which is decided by the deciding device so as to carry out the scaling process, and
  wherein the replay apparatus comprises;
  a request signal receiving device to receive the request signal which is transmitted by the request signal transmission device of the video output apparatus, and
  a between-pixel interpolation method information return device to return the between-pixel interpolation method information of the replay apparatus to the video output apparatus in response to the request signal.

2. A scaling process system comprising a replay apparatus and a video output apparatus which are connected via a HDMI,
  wherein each of the video output apparatus and the replay apparatus respectively comprises a between-pixel interpolation method table for deciding a superiority/inferiority of a between-pixel interpolation method which is used when carrying out a scaling process in the scaling process system,
  wherein the replay apparatus comprises;
  a request signal transmission device to transmit a request signal for requesting between-pixel interpolation method information which indicates the between-pixel interpolation method which is used when carrying out the scaling process in the video output apparatus to the video output apparatus,
  a between-pixel interpolation method information receiving device to receive the between-pixel interpolation method information which is returned from the video output apparatus in response to the request signal,
  a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus,
  a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process, and wherein the video output apparatus comprises;

a request signal receiving device to receive the request signal which is transmitted by the request signal transmission device of the replay apparatus, and a between-pixel interpolation method information return device to return the between-pixel interpolation method information of the video output apparatus to the replay apparatus in response to the request signal.

3. The scaling process system as claimed in claim 1, wherein the request signal transmission device transmits the request signal by a CEC vendor command of the HDMI, and the between-pixel interpolation method information return device returns the between-pixel interpolation method information by the CEC vendor command of the HDMI.

4. A video output apparatus which is connected with a replay apparatus via a HDMI, comprising:

a between-pixel interpolation method table to decide a superiority/inferiority of a between-pixel interpolation method which is used when carrying out a scaling process;

a request signal transmission device to transmit a request signal for requesting between-pixel interpolation method information which indicates the between-pixel interpolation method which is used when carrying out the scaling process in the replay apparatus to the replay apparatus, a between-pixel interpolation method information receiving device to receive the between-pixel interpolation method information which is returned from the replay apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the replay apparatus which is received by the between-pixel interpolation method information receiving device with the between-pixel interpolation method information of the video output apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process.

5. A replay apparatus which is connected with a video output apparatus via a HDMI, comprising:

a between-pixel interpolation method table to decide a superiority/inferiority of a between-pixel interpolation method which is use when carrying out a scaling process;

a request signal transmission device to transmit a request signal for requesting between-pixel interpolation method information which indicates the between-pixel interpolation method which is used when carrying out the scaling process in the video output apparatus to the video output apparatus, a between-pixel interpolation method information receiving device to receive the between-pixel interpolation method information which is returned from the video output apparatus in response to the request signal, a determining device to determine which of between-pixel interpolation method information of the replay apparatus or between-pixel interpolation method information of the video output apparatus is more high-performance based on the between-pixel interpolation method table by comparing the between-pixel interpolation method information of the video output apparatus which is received by the between-pixel interpolation method information receiving device with the between-pixel interpolation method information of the replay apparatus, a deciding device to decide an apparatus in which the between-pixel interpolation method information which is determined as being high-performance by the determining device is stored as an apparatus to be used for the scaling process, and a control device to control the apparatus which is decided by the deciding device so as to carry out the scaling process.

* * * * *